US008835039B2

(12) United States Patent  
Teng et al.

(10) Patent No.: US 8,835,039 B2  
(45) Date of Patent: Sep. 16, 2014

(54) BATTERY COOLING PLATE AND COOLING SYSTEM

(71) Applicant: AVL North America Inc., Plymouth, MI (US)

(72) Inventors: Ho Teng, Canton, MI (US); Franz DeCarli, Milford, MI (US); Chris Hennessy, Oakland Township, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 53 days.

(21) Appl. No.: 13/652,530

(22) Filed: Oct. 16, 2012

(65) Prior Publication Data

US 2013/0143093 A1    Jun. 6, 2013

Related U.S. Application Data

(60) Provisional application No. 61/549,861, filed on Oct. 21, 2011.

(51) Int. Cl.

| | | |
|---|---|---|
| H01M 10/50 | (2006.01) | |
| H01M 10/617 | (2014.01) | |
| H01M 10/651 | (2014.01) | |
| H01M 10/6557 | (2014.01) | |
| H01M 10/613 | (2014.01) | |
| H01M 10/625 | (2014.01) | |
| H01M 10/656 | (2014.01) | |
| H01M 10/647 | (2014.01) | |

(52) U.S. Cl.  
CPC ...... *H01M 10/5004* (2013.01); *H01M 10/5008* (2013.01); *H01M 10/5036* (2013.01); *H01M 10/5059* (2013.01); *H01M 10/5032* (2013.01); *H01M 10/5016* (2013.01); *H01M 10/5061* (2013.01); *Y02E 60/12* (2013.01)  
USPC .......................................... 429/120

(58) Field of Classification Search  
USPC .......................................................... 429/120  
See application file for complete search history.

(56) References Cited

U.S. PATENT DOCUMENTS

| | | | |
|---|---|---|---|
| 5,756,227 A * | 5/1998 | Suzuki et al. ................... | 429/62 |
| 7,579,099 B2 | 8/2009 | Lee et al. | |
| 7,851,080 B2 | 12/2010 | Weber et al. | |
| 2002/0012833 A1* | 1/2002 | Gow et al. ..................... | 429/120 |
| 2009/0142628 A1 | 6/2009 | Okada et al. | |
| 2009/0255109 A1 | 10/2009 | Weber et al. | |
| 2009/0258289 A1 | 10/2009 | Weber et al. | |
| 2009/0325054 A1 | 12/2009 | Payne et al. | |
| 2011/0212355 A1 | 9/2011 | Essinger et al. | |

FOREIGN PATENT DOCUMENTS

| | | |
|---|---|---|
| EP | 0964460 A1 | 12/1999 |
| EP | 1271085 A2 | 1/2003 |
| EP | 964460 B1 * | 5/2005 |
| EP | 2149771 A1 | 2/2010 |
| EP | 2367220 A1 | 9/2011 |

\* cited by examiner

*Primary Examiner* — Gregg Cantelmo  
(74) *Attorney, Agent, or Firm* — Harness, Dickey & Pierce P.L.C.

(57) ABSTRACT

A battery module according to one embodiment of this disclosure includes a battery pack including multiple spaced apart battery cells, and a cooling system having multiple cooling plates providing a cooling plenum. The cooling plates are arranged in an alternating relationship between the battery cells, with each cooling plate including at least a first cooling channel and a second cooling channel. The first cooling channel has a first shape and is arranged in a first thermal region, and the second cooling channel has a second shape different than the first shape, and is arranged in a second thermal region different than the first thermal region.

12 Claims, 3 Drawing Sheets

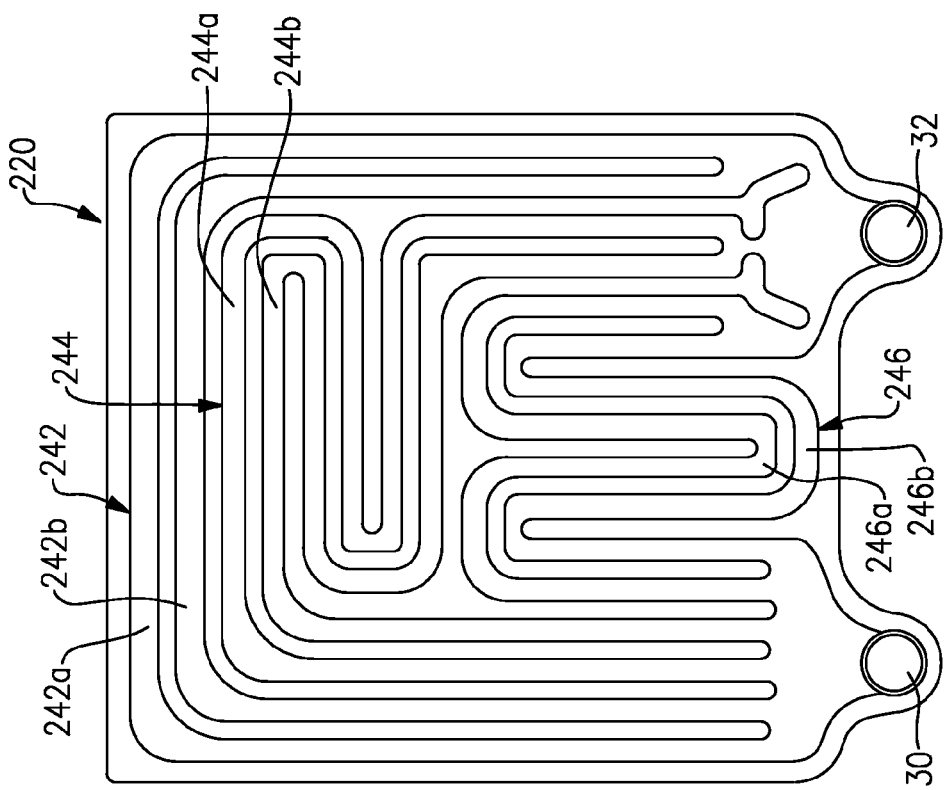
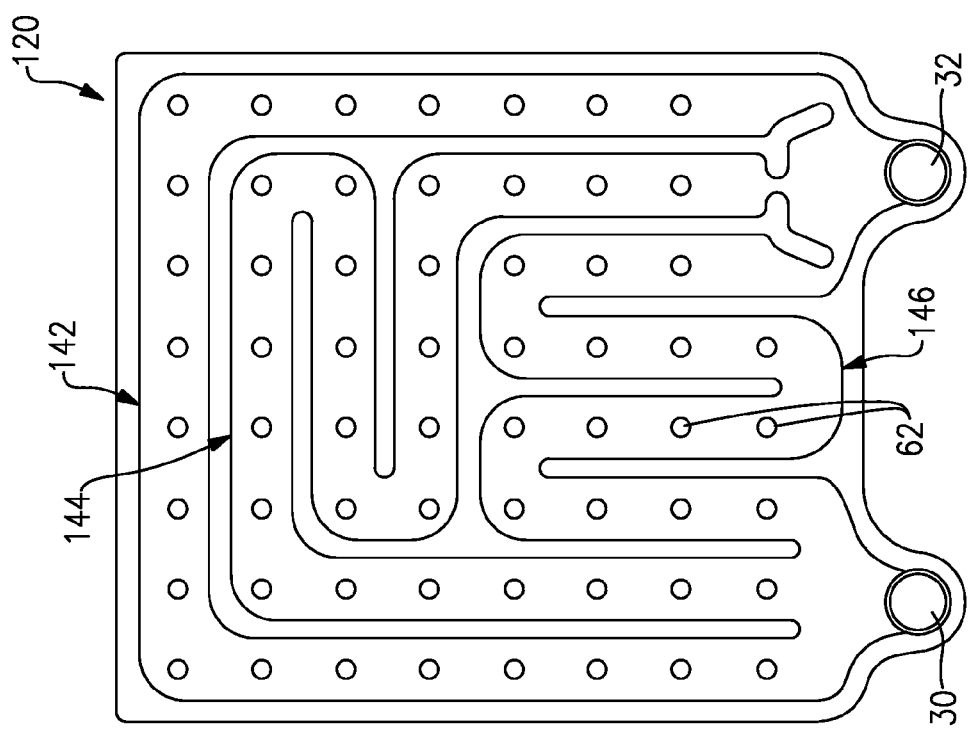

BATTERY COOLING PLATE AND COOLING SYSTEM

RELATED APPLICATIONS

This application claims the benefit of U.S. Provisional Application No. 61/549,861, filed Oct. 21, 2011, the entirety of which is herein incorporated by reference.

BACKGROUND

Battery modules, such as those used in hybrid vehicles, are known to include multiple battery cells. During operation, the temperature of these battery cells increases, and often the heated battery cells have an uneven temperature gradient. In one known system, cooling plates are provided between battery cells, and coolant flows through a passage in each cooling plate to cool the adjacent battery cells.

SUMMARY

A battery module according to one embodiment of this disclosure includes a battery pack including multiple spaced apart battery cells, and a cooling system having multiple cooling plates providing a cooling plenum. The cooling plates are arranged in an alternating relationship between the battery cells, with each cooling plate including a first cooling channel and a second cooling channel. The first cooling channel has a first shape and is arranged in a first thermal region, and the second cooling channel has a second shape different than the first shape, and is arranged in a second thermal region different than the first thermal region.

In another embodiment of this disclosure, the cooling plate includes first, second, and third cooling channels. The first cooling channel is provided in a U-shape, and the second cooling channel is provided in a serpentine-shape in a first direction. The third cooling channel is provided in a serpentine-shape in a second direction generally perpendicular to the first direction.

These and other features of the present disclosure can be best understood from the following drawings and detailed description.

BRIEF DESCRIPTION OF THE DRAWINGS

The drawings can be briefly described as follows:

FIGS. 5A-5B illustrate further examples of cooling plates.

DETAILED DESCRIPTION

Figure 1:
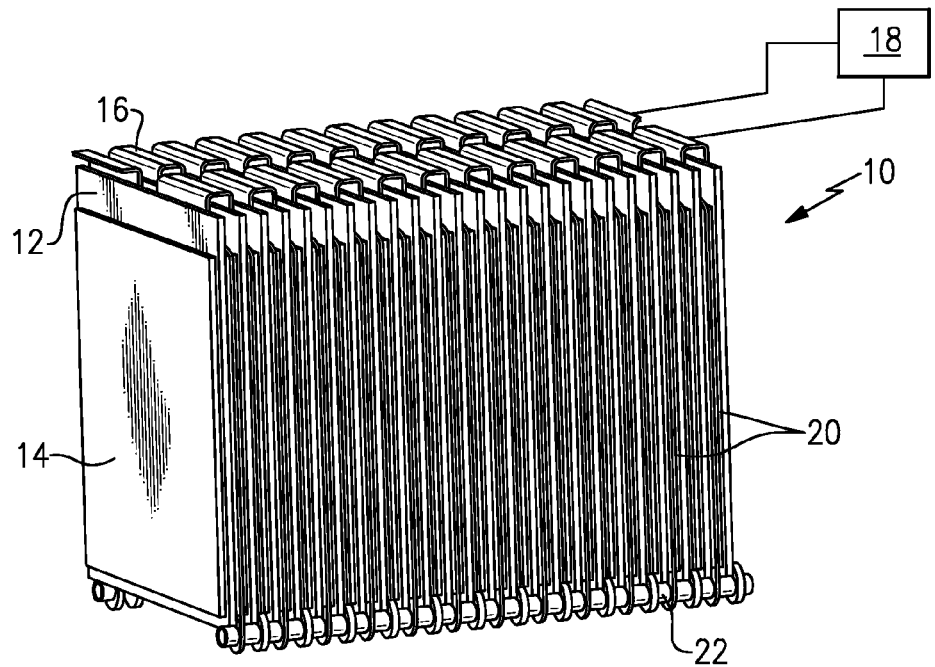
FIG. 1 illustrates an example battery module.

An example battery module 10 is illustrated in FIG. 1. The battery module 10 includes multiple battery cells 12 having a thermal pad 14 arranged on either side of each battery cell 12. The thermal pads 14 thermally insulate the battery cells 12 as well as accommodate thermal expansion within the battery module 10 during operation.

Each battery cell 12 provides a busbar 16 that connects one voltage terminal (positive or negative) of the cell to the opposite voltage terminal (negative or positive) of the adjacent cell 12. Through busbars 16, the cells 12 in the battery module 10 are electrically connected to one another to power a load 18. The busbars 16 are arranged at the top of the battery module 10. It should be understood, however, that "top," "bottom," "lateral side" and other terms relating to position and orientation are for exemplary purposes only. That is, these terms are used for convenience only and should not be understood as limiting in any way.

A cooling plate 20 is arranged between each pair of battery cells 12. The cooling plates 20 are joined to one another to provide a cooling plenum 22 that is part of a cooling system 24, illustrated in FIG. 2.

Figure 2:
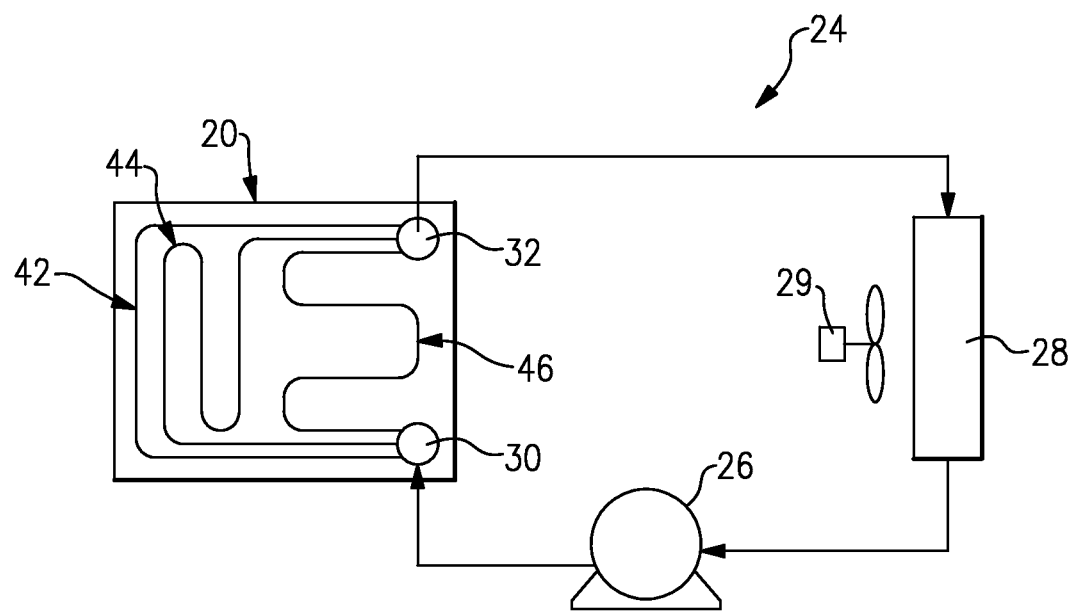
FIG. 2 schematically illustrates an example cooling system.

Turning to FIG. 2, and with continued reference to FIG. 1, an example cooling system 24 includes a pump 26 that circulates cooling fluid through the cooling system 24. In this example, the pump 26 first circulates the cooling fluid to the cooling plenum 22 to receive heat rejected from the battery module 10. The heated cooling fluid is then circulated to a heat exchanger 28, which may include a fan 29, to reject the heat from the cooling fluid to the surrounding environment. If desired, the cooling system 24 could include additional components, such as an expansion valve. In one example, an expansion valve is positioned upstream of the battery module 10.

Figure 3:
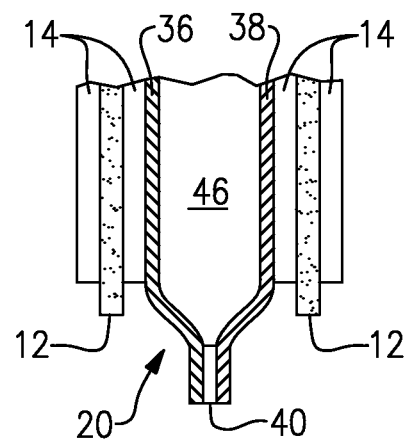
FIG. 3 illustrates a portion of the battery module, in cross section, and in particular illustrates the detail of an example cooling plate.

The cooling plates 20 are provided by first and second sheets 36, 38, as illustrated in FIG. 3, that are secured to one another by a material 40, such as braze. In one example, the first and second sheets 36, 38 are constructed from aluminum sheets that each have a thickness of 0.2-0.5 mm (0.0078-0.0196 in.). It should be understood that any number of manufacturing methods may be employed to produce the cooling plate. For example, the aluminum sheets may be stamped and then brazed or laser welded to one another.

The cooling plate 20 has at least two channels arranged in two discrete thermal regions having discrete, different flow paths than one another. In one example, the cross-sectional area of the cooling channels is 0.5 mm×8 mm (0.0196-0.3150 in.). In one example, the cooling plate has three different thermal regions, X, Y, Z, illustrated in FIG. 4. In one battery module arrangement, 60% of the heat is within the top 40% of the battery cell 12. In such an arrangement, the first and second thermal region X, Y would correspond to the top 40% of the battery cell 12.

Figure 4:
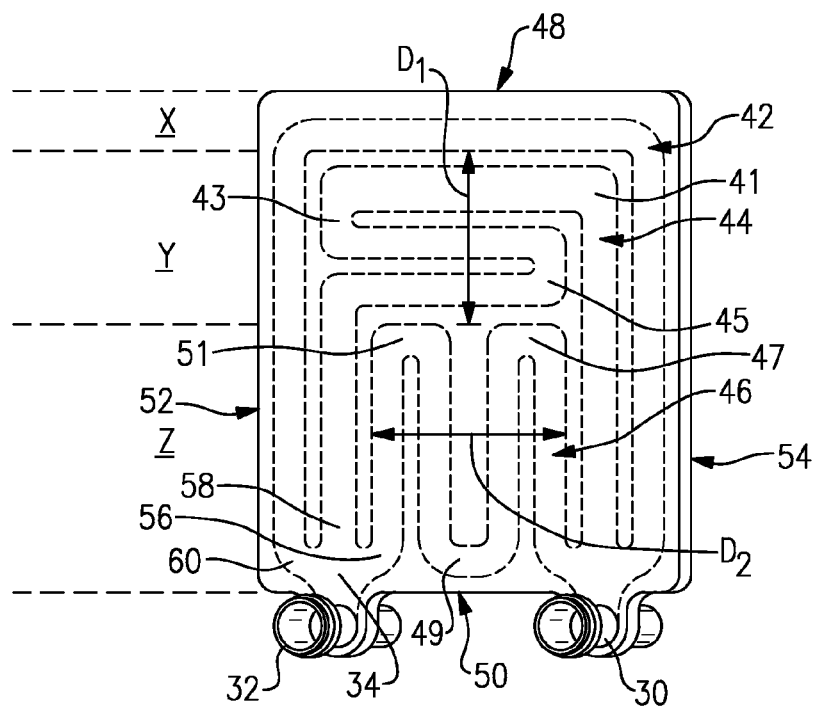
FIG. 4 illustrates an example cooling plate.

FIG. 4 illustrates the detail of an example cooling plate 20. The cooling plate 20 includes inlet and outlet ports 30, 32. Further, the cooling plate 20 has a top side 48, bottom side 50 and lateral sides 52, 54. The busbars are arranged at the top side 48, and the inlet and outlet ports are arranged at the bottom side 50. Generally, the battery cells 12 are hottest near the busbars 16 and coolest on the sides remote from the busbars.

In the example, the first thermal region X is primarily arranged at the top of the cooling plate 20, adjacent to the busbars 16, which generate a significant amount of heat. The first cooling channel 42 has a "pi" or inverted U-shape that runs along the lateral side 52 from the inlet port 30 up to the top side 48, then along the lateral side 54 to the outlet port 42. The first cooling channel 42 is dedicated to quickly removing heat from the first thermal region X in one pass.

The second cooling channel 44 is primarily arranged in the second thermal region Y, which is located within the top 40% of the cooling plate 20, but away from the busbars 16. The second cooling channel 44 is further positioned within the first cooling channel 42. The second cooling channel 44 is serpentine-shaped, here an S-shape, about a first direction D1, which is generally perpendicular to the lateral sides 52, 54 of the cooling plate 20. In the example shown, the second cooling channel 44 runs upward to the first cooling channel 42, turns laterally inwardly, at 41, and then doubles back twice, at 43 and 45, before returning downward to the outlet port 32 at about the halfway point. In this manner, the heat from the top of the cooling plate is used to heat cooler parts of the plate and more evenly distribute heat.

The third cooling channel 46 is primarily arranged in the third thermal region Z. In the illustrated example, the third cooling channel 46 is serpentine-shaped about a second direction D2, which is generally perpendicular to D1. As shown, the third cooling channel 46 is positioned within the second cooling channel 44, and runs from the cooling inlet 30 vertically to about midway up the cooling plate 20 before doubling back several times, at 47, 49 and 51, before returning to the cooling outlet 32. The serpentine flow path flows to the warmer part of the cooling plate (near the thermal region Y) to pick up heat and distribute the heat to the coolest part (thermal region Z), near the ports 30, 32.

It should be understood that while the second cooling channel 44 is shown as an S-shape, the second channel could include any number of turns, and is not limited to only including two turns. Further, while the second cooling channel 44 is serpentine-shaped about the first direction D1 extending generally parallel to the lateral sides 52, 54 of the cooling plate 20, the second cooling channel could be oriented in another direction, such as D2. For example, in one embodiment, the second cooling channel 44 is serpentine-shaped about the second direction D2, while still being primarily positioned in the second thermal region Y, and the third cooling channel 46 is serpentine shaped about the first direction D1 while still being primarily positioned in the third thermal region Z.

Turning back to FIG. 4, the ends of the first, second and third cooling channels 42, 44, 46 converge in a mixing section 34 near the outlet port 42. Each of the first, second and third cooling channels 42, 44, 46 respectively include first, second, third metering orifices 56, 58, 60 that regulate the flow of fluid through each of the respective cooling channels.

The orifices 56, 58, 60 are sized to achieve a desired relative flow between the cooling channels, which results in achieving a desired temperature gradient across the cooling plate. In one example, the first cooling channel 42 receives approximately 40% of the flow, the second cooling channel 44 receives approximately 35% of the flow, and the third cooling channel 46 receives approximately 25% of the flow. For the purposes of this disclosure, the term "approximately" includes values within tolerances accepted in this art. The size of the orifices 56, 58, 60 also provides a desired pressure drop for each cooling plate 20. This leads to a uniform distribution of coolant between each of the cooling plates 20, at a system level.

Another example cooling plate 120 is illustrated in FIG. 5A. The cooling plate incorporates dimples 62 in the first, second and third cooling channels 142, 144, 146 to provide more structural integrity to the cooling channels.

As illustrated in the cooling plate 220 of FIG. 5B, alternatively or additionally, each cooling channel may comprise multiple sub-channels. In the example, the first cooling channel 242 includes first and second sub-channels 242a, 242b; second cooling channel 244 includes first and second sub-channels 246a, 246b; and third cooling channel 246 includes first and second sub-channels 246a, 246b.

This disclosure thus provides a uniform coolant flow distribution for each battery cell in the battery module. This disclosure further provides a desired, localized coolant flow within each battery cell, which efficiently cools each of the cells and further serves to minimize temperature differences within each battery cell, as mentioned above.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A battery module comprising:
    a battery pack including multiple spaced apart battery cells; and
    a cooling system having multiple cooling plates providing a cooling plenum, the cooling plates arranged in alternating relationship between the battery cells, each cooling plate including a first cooling channel, a second cooling channel, and a third cooling channel, the first cooling channel arranged in a first thermal region proximate to busbars of the battery cells and having an inverted U-shape, the second cooling channel arranged in a second thermal region different than the first thermal region and having a serpentine shape in a first direction that is different than the first shape, and the third cooling channel arranged in a third thermal region and having a serpentine-shape in a second direction generally perpendicular to the first direction that is different than the first shape and the second shape, the third thermal region being different than the first thermal region and the second thermal region and disposed proximate to coolant inlet and outlet ports arranged on a side opposite the busbars.

2. The battery module as recited in claim 1, including a pump configured to circulate a cooling fluid through the cooling system.

3. The battery module as recited in claim 2, including a heat rejecting heat exchanger upstream of the pump and downstream of the battery pack.

4. A cooling plate for a battery module comprising:
    first, second and third cooling channels, respectively including first, second and third shapes that, respectively, provide first, second and third thermal regions, wherein the first, second and third thermal regions are different than one another, the third thermal region being proximate a coolant inlet port and a coolant outlet port, the first thermal region being located opposite the third thermal region, wherein the first cooling channel is provided in a U-shape, the second cooling channel is provided in a serpentine-shape about a first direction, and the third cooling channel is provided in a serpentine-shape about a second direction generally perpendicular to the first direction.

5. The cooling plate as recited in claim 4, including a first sheet and a second sheet, the first sheet and the second sheet providing the first, second and third cooling channels.

6. The cooling plate as recited in claim 5, wherein the first sheet and the second sheet each have a thickness of 0.2 mm to 0.5 mm.

7. The cooling plate as recited in claim 4, wherein the first, second and third cooling channels, respectively, include first, second and third metering orifices adjacent the coolant outlet ports.

8. The cooling plate as recited in claim 7, wherein the first cooling channel is sized such the first cooling channel receives approximately 40% of a coolant flow, the second cooling channel receives approximately 35% of the coolant flow, and the third cooling channel receives approximately 25% of the coolant flow.

9. The cooling plate as recited in claim 4, wherein each of the first, second and third cooling channels includes at least one sub-channel.

10. The cooling plate as recited in claim 4, wherein the first cooling channel is provided in an inverted U-shape such that the first cooling channel runs from the coolant inlet port along a lateral side of the cooling plate, along a top side of the cooling plate, and along another lateral side of the cooling plate to the coolant outlet port.

11. The cooling plate as recited in claim 10, wherein the second cooling channel is positioned within the first cooling channel, and wherein the first direction is generally perpendicular to the lateral sides of the cooling plate.

12. The cooling plate as recited in claim 11, wherein the third cooling channel is positioned within the second cooling channel.

* * * * *